(12) United States Patent
Hashimoto et al.

(10) Patent No.: US 10,951,791 B2
(45) Date of Patent: Mar. 16, 2021

(54) IMAGE PROCESSING APPARATUS, METHOD FOR PROCESSING IMAGE, AND RECORDING MEDIUM FOR NOISE REMOVAL AND SKEW CORRECTION

(71) Applicants: Ayumu Hashimoto, Kanagawa (JP); Hajime Tsukahara, Kanagawa (JP); Hiroki Shirado, Kanagawa (JP); Yuuki Nakada, Kanagawa (JP); Tomohiko Ono, Kanagawa (JP); Tatsuya Ozaki, Kanagawa (JP); Hiroshi Kubo, Kanagawa (JP); Kimiharu Yanagisawa, Tokyo (JP); Yoshiaki Nagao, Kanagawa (JP); Masahiro Itoh, Kanagawa (JP)

(72) Inventors: Ayumu Hashimoto, Kanagawa (JP); Hajime Tsukahara, Kanagawa (JP); Hiroki Shirado, Kanagawa (JP); Yuuki Nakada, Kanagawa (JP); Tomohiko Ono, Kanagawa (JP); Tatsuya Ozaki, Kanagawa (JP); Hiroshi Kubo, Kanagawa (JP); Kimiharu Yanagisawa, Tokyo (JP); Yoshiaki Nagao, Kanagawa (JP); Masahiro Itoh, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/800,098

(22) Filed: Feb. 25, 2020

(65) Prior Publication Data
US 2020/0296255 A1  Sep. 17, 2020

(30) Foreign Application Priority Data
Mar. 11, 2019 (JP) .................................. 2019-044138

(51) Int. Cl.
*H04N 1/40* (2006.01)
*H04N 1/409* (2006.01)
(Continued)

(52) U.S. Cl.
CPC ....... *H04N 1/4097* (2013.01); *H04N 1/00748* (2013.01); *H04N 1/00753* (2013.01); *H04N 1/3878* (2013.01); *H04N 1/4092* (2013.01)

(58) Field of Classification Search
CPC combination set(s) only.
See application file for complete search history.

(56) References Cited

U.S. PATENT DOCUMENTS 10,194,051 B2 * 1/2019 Kawano ............. H04N 1/00748
2014/0376808 A1  12/2014 Hashimoto
(Continued)

FOREIGN PATENT DOCUMENTS

| JP | 11-341230 | 12/1999 |
| JP | 2008-028684 | 2/2008 |

(Continued)

*Primary Examiner* — Barbara D Reinier
(74) *Attorney, Agent, or Firm* — IPUSA, PLLC

(57) ABSTRACT

An image processing apparatus includes circuitry to: obtain a read image read from an image of a document output from an image reading device; detect an edge between a background area and a document area in the read image; sample a detection result of the edge at each first interval in a first direction to extract a first boundary point group including a plurality of boundary points; sample the detection result of the edge at each second interval in the first direction to extract a second boundary point group including a plurality of boundary points; determine a noise removal condition based on the first boundary point group; remove, from the second boundary point group, a boundary point satisfying the noise removal condition as noise; and calculate a linear equation approximating the second boundary point group from which the noise is removed.

12 Claims, 17 Drawing Sheets

(51) Int. Cl.
*H04N 1/00* (2006.01)
*H04N 1/387* (2006.01)

(56) References Cited

U.S. PATENT DOCUMENTS

| | | | |
|---|---|---|---|
| 2016/0028920 A1 | 1/2016 | Hashimoto | |
| 2017/0244853 A1 | 8/2017 | Yabuuchi et al. | |
| 2017/0264782 A1 | 9/2017 | Hashimoto | |
| 2018/0139345 A1 | 5/2018 | Goh et al. | |
| 2020/0053229 A1 | 2/2020 | Hashimoto et al. | |

FOREIGN PATENT DOCUMENTS

| | | | |
|---|---|---|---|
| JP | 2017-098841 | 6/2017 | |
| JP | 2017-108258 | 6/2017 | |

* cited by examiner

MAIN-SCANNING DIRECTION

SUB-SCANNING DIRECTION

IMAGE PROCESSING APPARATUS, METHOD FOR PROCESSING IMAGE, AND RECORDING MEDIUM FOR NOISE REMOVAL AND SKEW CORRECTION

CROSS-REFERENCE TO RELATED APPLICATIONS

This patent application is based on and claims priority pursuant to 35 U.S.C. § 119(a) to Japanese Patent Application No. 2019-044138, filed on Mar. 11, 2019, in the Japan Patent Office, the entire disclosure of which is hereby incorporated by reference herein.

BACKGROUND

Technical Field

The present invention relates to an image processing apparatus, a method for processing an image, and a recording medium.

Discussion of the Background Art

Conventionally, an image forming apparatus such as a copier corrects, with a mechanical mechanism, skew generated at the time when an automatic document feeder (ADF) reads a document. In recent years, there has been known an electric skew correction technique for correcting skew by image processing instead of correcting skew using a mechanical mechanism. The electric skew correction technique is a technique in which a skew angle is detected from a read image, which is read with skew being generated in a document, and correction is carried out by image processing based on such information. A document edge needs to be accurately detected from the read image to detect the skew angle in the electric skew correction technique.

SUMMARY

Example embodiments include an image processing apparatus includes circuitry to: obtain a read image read from an image of a document output from an image reading device; detect an edge between a background area and a document area in the read image; sample a detection result of the edge at each first interval in a first direction to extract a first boundary point group including a plurality of boundary points; sample the detection result of the edge at each second interval in the first direction to extract a second boundary point group including a plurality of boundary points; determine a noise removal condition based on the first boundary point group; remove, from the second boundary point group, a boundary point satisfying the noise removal condition as noise; and calculate a linear equation approximating the second boundary point group from which the noise is removed.

Example embodiments include an image processing method, and a control program stored on a recording medium for controlling one or more processors to perform the image processing method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
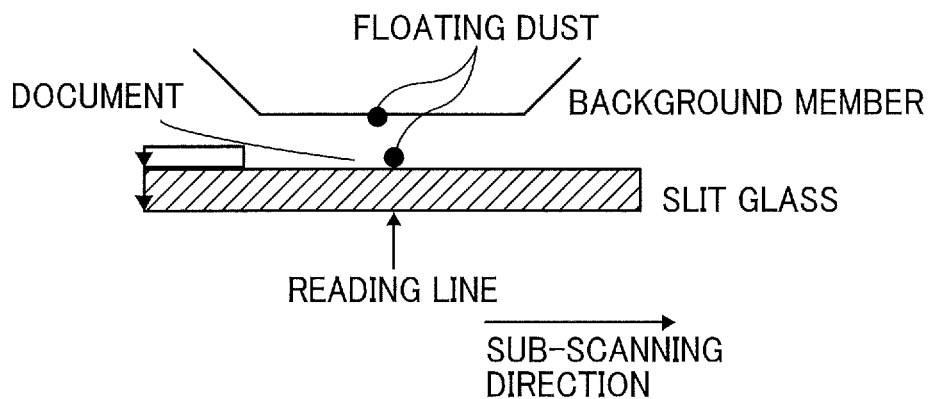
FIG. 1 is a diagram for illustrating a background art.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Problems to be solved by the conventional electric skew correction technique will be described with reference to FIGS. 1 to 3. FIG. 1 schematically illustrates a configuration around an image reader using an ADF. The ADF reads a conveyed document with a reading line extending in the main-scanning direction (direction orthogonal to the sheet surface in FIG. 1) to generate a read image. Accordingly, in the case of a skewed document, a timing at which the edge of the document reaches the reading line differs. Since the reading needs to be started from the time at which the edge of the document first reaches the reading line to fully read the document area, in the case of the skewed document, the read image results in an image including a background area.

Figure 2:
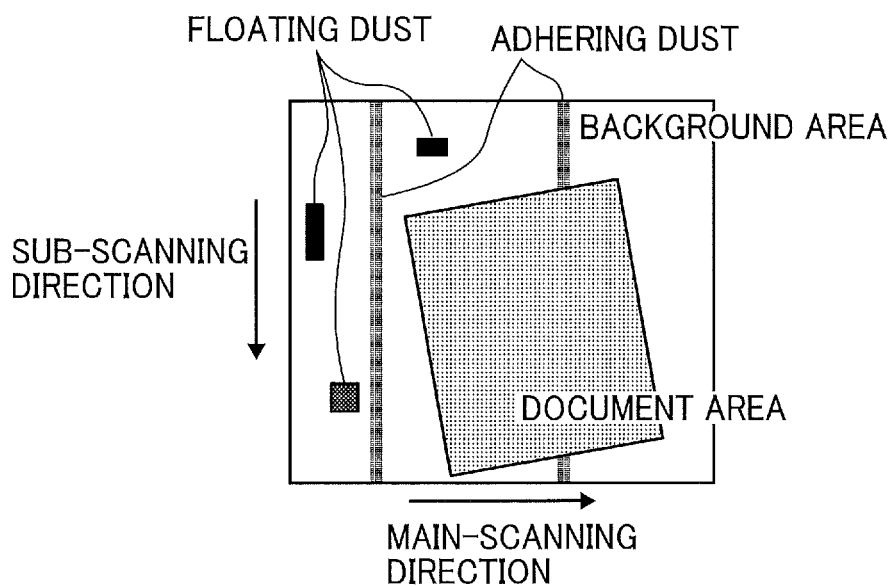
FIG. 2 is another diagram for illustrating the background art.

FIG. 2 is an image diagram of a read image in the case where various kinds of dust exist around the image reader. Dust may adhere to a background member. Such dust adhering to the background member (hereinafter referred to as adhering dust) generates streaky noise extending in the sub-scanning direction.

Further, during ADF reading, paper dust of the document or the like may float as dust between slit glass and the background member. In that case, the background area of the read image includes an image in which the dust that has floated (hereinafter referred to as floating dust) is read. In such a case of floating dust, it is attached to or separated from the slit glass or the background member during conveyance of the document, and thus block noise appears in the read image.

The streaky noise caused by adhering dust generated in the read image can be corrected by a convention method for processing image (e.g., see JP-2008-028684-A). However, floating dust needs to be dealt with not to cause erroneous edge detection.

Figure 3:
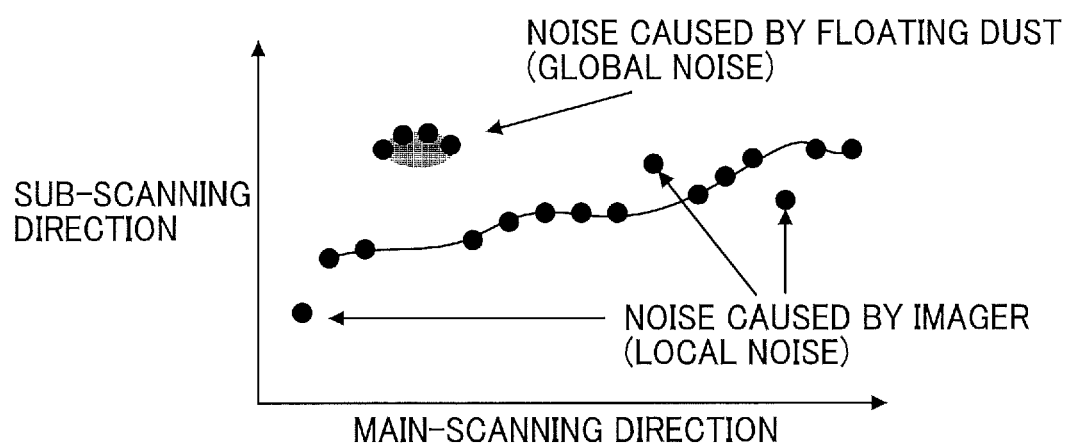
FIG. 3 is a graph for illustrating the background art.

FIG. 3 is a graph illustrating an exemplary boundary point group obtained by document edge detection. As illustrated in FIG. 3, floating dust becomes noise having a width in the main-scanning direction, which causes erroneous detection of the document edge. While an interval of sampling points (boundary points) to be used in calculation is preferably minimized to improve accuracy of a calculation formula of an approximation straight line for the purpose of detecting the skew angle, the noise caused by the floating dust is highly likely used in the calculation of the approximation straight line when the sampling interval is narrowed.

While the methods for removing noise disclosed in JP-2017-108258-A and JP-2017-098841-A are effective for local noise generated locally, such as the noise caused by the imager illustrated in FIG. 3, the methods are not effective for global noise having a certain size or more, such as noise caused by floating dust. The floating dust is assumed to have a size of several pixels to several tens of pixels and to have a width, and the noise caused by the floating dust has continuity and affects the median value, whereby the noise cannot be removed by the methods for removing noise disclosed in the documents above.

Hereinafter, embodiments for carrying out the invention will be described with reference to the accompanying drawings. Note that the same elements are denoted by the same reference signs in the descriptions of the drawings, and duplicate descriptions will be omitted.

First Embodiment

Configuration of Image Forming Apparatus

Figure 4:
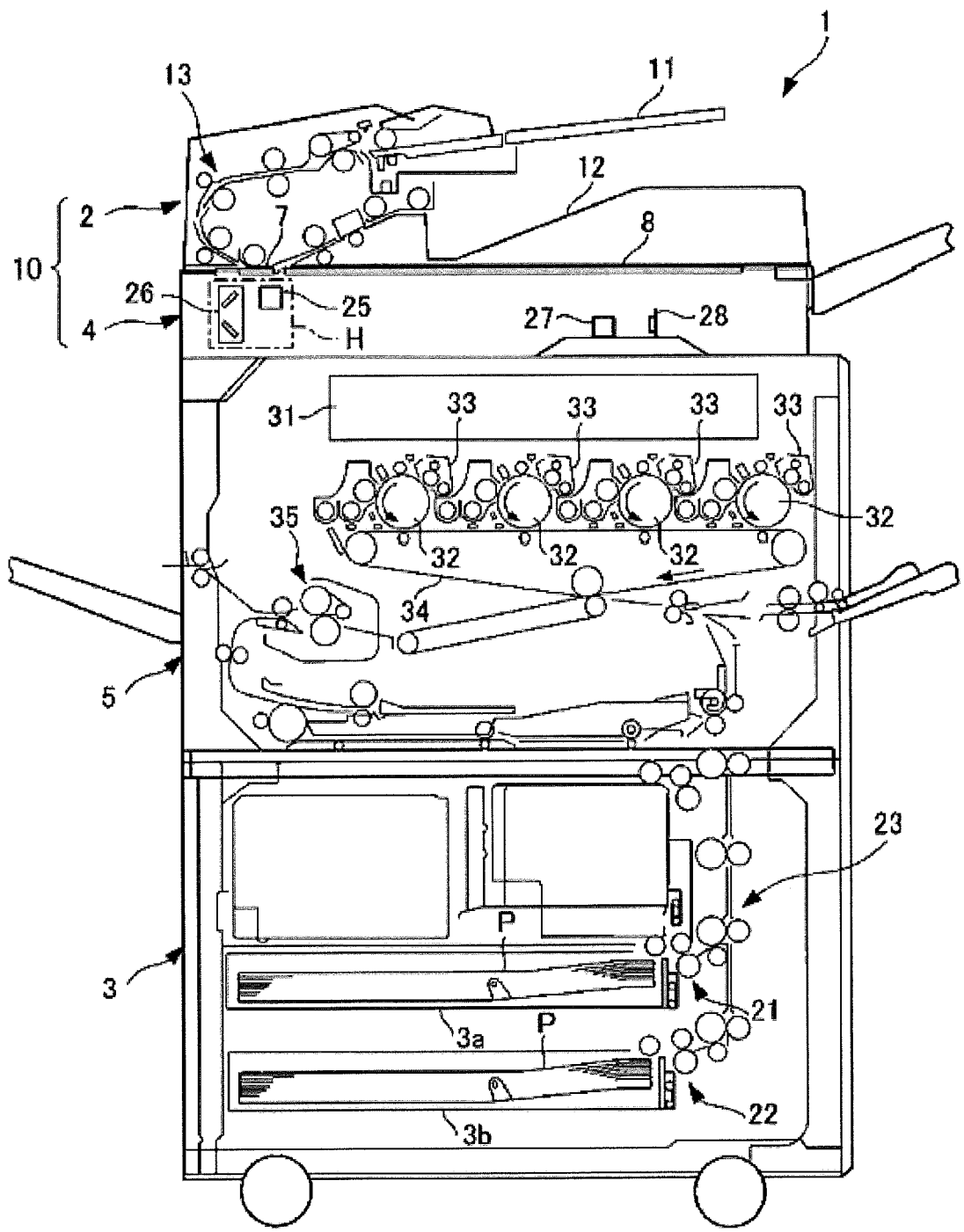
FIG. 4 is a diagram illustrating an image forming apparatus including an automatic document feeder according to a first embodiment.

FIG. 4 is a diagram illustrating an image forming apparatus including an automatic document feeder according to a first embodiment. FIG. 4 illustrates an exemplary case where the image forming apparatus is applied to an electrophotographic copier 1. Examples of the copier include a full-color copier that forms an image using a general method for electrostatic image formation, and a copier that forms a monochrome image. As a method for image formation, for example, an inkjet method can be used in addition to the electrophotographic method. Furthermore, the image forming apparatus may be, in addition to the copier 1, a facsimile machine, a printer, a scanner, a multifunction peripheral, or the like.

As illustrated in FIG. 4, the copier 1 includes an automatic document feeder (hereinafter simply referred to as ADF) 2, a sheet feeder 3, an image reader 4, and an image former 5. In the present embodiment, the ADF 2 and the image reader 4 constitute an image reading device 10.

As will be described in detail later, the ADF 2 includes a document tray 11 as a document placement table, and a conveyer 13 including various rollers and the like. The ADF 2 separates documents one by one from a document bundle placed on the document tray 11, and conveys the documents onto slit glass 7 using the conveyer 13. Then, the ADF 2 causes the document having been subject to reading performed by the image reader 4 via the slit glass 7 to pass over the slit glass 7, and ejects the document onto a sheet ejection tray 12. The ADF 2 is attached to the image reader 4 to be openable/closable.

The sheet feeder 3 includes sheet feeding cassettes 3a and 3b, sheet feeding devices 21 and 22, and a conveyance unit 23. The sheet feeding cassettes 3a and 3b store recording paper sheets having different sheet sizes. Each of the sheet feeding devices 21 and 22 picks up and feeds a recording paper sheet P as a recording medium stored in the sheet feeding cassettes 3a and 3b. The conveyance unit 23 includes various rollers that convey the recording paper sheet P fed from the sheet feeding devices 21 and 22 to a predetermined image forming position of the image former 5.

The image reader 4 includes a first carriage 25, a second carriage 26, an imaging forming lens 27, and an imager 28. The first carriage 25 includes a light source and a mirror member. The second carriage 26 includes a mirror member.

As will be described in detail later, in the case of reading an image of the document conveyed by the ADF 2, the image reader 4 moves the first carriage 25 and the second carriage 26 to a position indicated by "H" in FIG. 4 directly under the slit glass 7, and stops the first carriage 25 and the second carriage 26 at that position. Then, the light source mounted on the first carriage 25 irradiates the document passing over the slit glass 7 with light, each of the mirror members mounted on the first carriage 25 and the second carriage 26 reflects the reflected light from the document, the imaging forming lens 27 forms an image of the reflected light, and the imager 28 reads the image.

Meanwhile, in the case of reading a document placed on contact glass 8, the first carriage 25 and the second carriage 26 move in the lateral direction (sub-scanning direction) in FIG. 4. Then, in the process of moving the first carriage 25 and the second carriage 26, the light source irradiates the document with light, each of the mirror members mounted on the first carriage 25 and the second carriage 26 reflects the reflected light from the document, the imaging forming lens 27 forms an image of the reflected light, and the imager 28 reads the image.

The image former 5 includes an exposure device 31, a plurality of photoconductor drums 32, developing devices 33, a transfer belt 34, and a fixing device 35. The developing device 33 is filled with toner of different colors of cyan, magenta, yellow, and black.

On the basis of the image read by the imager 28, the image former 5 exposes each of the photoconductor drums 32 with the exposure device 31 to form a latent image on each of the photoconductor drums 32, supplies different colors of toner to the respective photoconductor drums 32 with the respective developing devices 33, and performs development. Then, the image former 5 transfers the image developed on each of the photoconductor drums 32 by the transfer belt 34 to the recording paper sheet P supplied from the sheet feeder 3, and then fuses, with the fixing device 35, the toner of the toner image transferred onto the recording paper sheet P to fix the color image on the recording paper sheet P. As a result, a full-color image is formed on the recording paper sheet P.

Figure 5:
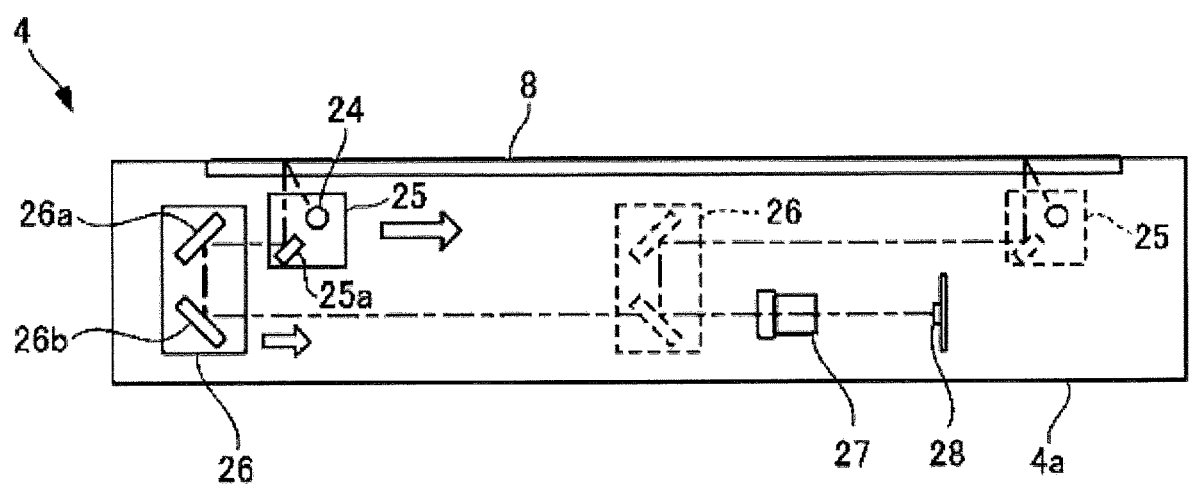
FIG. 5 is a diagram illustrating a detailed configuration of an image reader, according to the first embodiment.

Next, a detailed configuration of the image reader 4 will be described with reference to FIG. 5. As illustrated in FIG. 5, the image reader 4 includes the first carriage 25, the second carriage 26, the imaging forming lens 27, and the imager 28, and those components are disposed inside a body frame 4a of the image reader 4. A first rail and a second rail (not illustrated) are provided inside the body frame 4a to extend in the sub-scanning direction (lateral direction in FIG. 5). The first rail includes two rails disposed to be spaced apart from each other at a predetermined interval in the main-scanning direction orthogonal to the sub-scanning direction. The second rail has a configuration similar to the configuration of the first rail.

The first carriage 25 is attached to the first rail in a slidable manner. The first carriage 25 is capable of reciprocating in the sub-scanning direction via a drive wire (not illustrated) for the first carriage using a drive motor (not illustrated). The first carriage 25 reciprocates between a position indicated by a solid line and a position indicated by a broken line in FIG. 5.

The second carriage 26 is attached to the second rail in a slidable manner The second carriage 26 is capable of reciprocating in the sub-scanning direction via a drive wire (not illustrated) for the second carriage using a drive motor (not illustrated). The second carriage 26 reciprocates between a position indicated by a solid line and a position indicated by a broken line in FIG. 5.

The first carriage 25 and the second carriage 26 move in the sub-scanning direction at a speed ratio of 2:1. With such a moving speed relationship, even if the first carriage 25 and the second carriage 26 move, the optical path length from the document surface to the imaging forming lens 27 is kept constant.

The first carriage 25 includes a light source 24 and a first mirror member 25a. The second carriage 26 includes a second mirror member 26a and a third mirror member 26b.

The imaging forming lens 27 collects and images the reflected light from the document, which has entered through each mirror member, on the imager 28. The imager 28 includes an imaging element such as a charge-coupled device (CCD). The imager 28 performs photoelectric conversion on the optical image of the document formed through the imaging forming lens 27, and outputs analog image signals as a read image.

Figure 6:
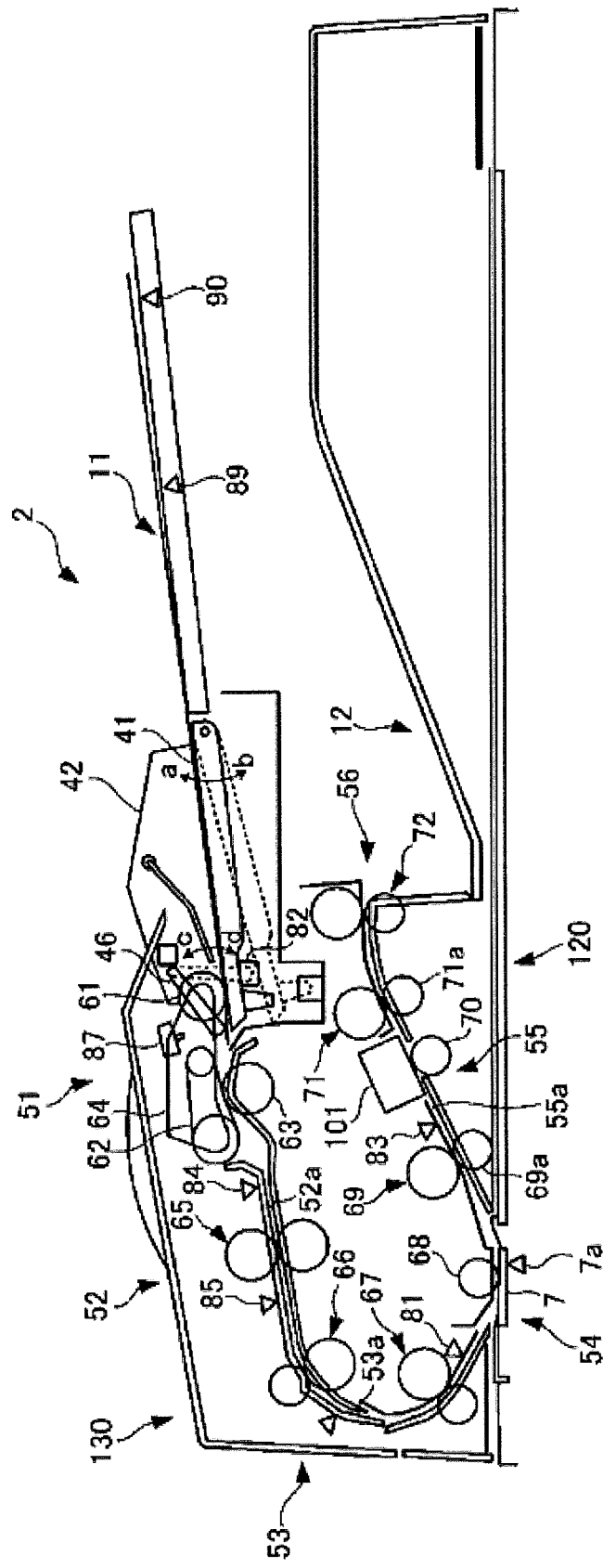
FIG. 6 is a diagram illustrating a detailed configuration of an ADF, according to the first embodiment.

Next, a detailed configuration of the ADF 2 will be described with reference to FIG. 6. As illustrated in FIG. 6, the document tray 11 includes a movable document table 41, and a pair of side guide plates 42. The movable document table 41 rotates in the directions of "a" and "b" in the drawing with the base end serving as a fulcrum. The pair of side guide plates 42 positions the right-to-left direction with respect to the sheet feeding direction of the document. With the movable document table 41 rotating, the front end of the document in the feeding direction is adjusted to an appropriate height.

The document tray 11 is provided with document length detection sensors 89 and 90 that detect whether the document orientation is portrait or landscape, which are spaced apart from each other in the feeding direction. Note that a reflection sensor that performs detection with an optical unit in a non-contact manner, or a contact-type actuator sensor can be used as the document length sensors 89 and 90.

One side of the pair of side guide plates 42 is slidable in the right-to-left direction with respect to the sheet feeding direction, and documents in different sizes can be placed on the side.

On the secured side of the pair of side guide plates 42 is provided with a set filler 46 that rotates with the document being placed. Furthermore, the set filler 46 is provided with, at the lowermost part on the movement trajectory of the tip of the set filler 46, a document set sensor 82 that detects placement of the document on the document tray 11. In other words, the document set sensor 82 detects whether there is a document set on the ADF 2 on the basis of whether or not the set filler 46 has rotated to be away from the document set sensor 82.

The conveyer 13 (see FIG. 4) of the ADF 2 includes a separation feeding unit 51, a pull-out unit 52, a turn unit 53, a first reading conveyer 54, a second reading conveyer 55, and a sheet ejector 56.

The separation feeding unit 51 includes a pickup roller 61 disposed in the vicinity of the sheet feeding port, and a sheet feeding belt 62 and a reverse roller 63 disposed to face each other across a conveying path.

The pickup roller 61 is supported by a support arm member 64 attached to the sheet feeding belt 62, and moves up and down in the directions of "c" and "d" in the drawing between a contact position in contact with a document bundle and a separated position away from the document bundle via a cam mechanism (not illustrated). The pickup roller 61 picks up several (ideally one) documents out of the documents stacked on the document tray 11 at the contact position.

The sheet feeding belt 62 rotates in the feeding direction. The reverse roller 63 rotates in the direction opposite to the feeding direction. While the reverse roller 63 rotates in the reverse direction with respect to the sheet feeding belt 62 when the documents are double-fed, in a case where the reverse roller 63 is in contact with the sheet feeding belt 62, or in a case where only one sheet of the documents is being conveyed, the reverse roller co-rotates with the sheet feeding belt 62 due to the action of a torque limiter (not illustrated). As a result, double feeding of the documents is suppressed.

The pull-out unit 52 includes pull-out rollers 65 including a pair of rollers disposed to sandwich a conveying path 52a. The pull-out unit 52 primarily abuts and aligns the fed document according to the drive timing of the pull-out rollers 65 and the pickup roller 61, and pulls out and conveys the aligned document.

The turn unit 53 includes intermediate rollers 66 and reading entrance rollers 67, which include a pair of rollers disposed to sandwich a conveying path 53a curved from the top to the bottom. The turn unit 53 conveys the document pulled out and conveyed by the intermediate rollers 66 on the curved conveying path to turn the document, and conveys, using the reading entrance rollers 67, the document with the document front surface facing downward to the vicinity of the slit glass 7.

Here, the conveyance speed of the document from the pull-out unit 52 to the turn unit 53 is set to be higher than the conveyance speed of the first reading conveyer 54. This shortens the time required for conveying the document conveyed to the first reading conveyer 54.

The first reading conveyer 54 includes a first reading roller 68 and a first reading exit roller 69. The first reading roller 68 is disposed to face the slit glass 7. The first reading exit roller 69 is disposed on a conveying path 55a after the reading is complete. The first reading conveyer 54 conveys the document conveyed to the vicinity of the slit glass 7 with the document front surface being brought into contact with the slit glass 7 by the first reading roller 68, and further conveys the document after the reading is complete using the first reading exit roller 69.

The second reading conveyer 55 includes a second reader 101, a second reading roller 70, and a second reading exit roller 71. The second reader 101 reads the back surface of the document. The second reading roller 70 is disposed to face the second reader 101 across the conveying path 55a. The second reading exit roller 71 is disposed downstream of the second reader 101 in the conveyance direction.

On the second reading conveyer 55, the second reader 101 reads the back surface of the document after the front surface reading is complete. The document having been subject to back surface reading is conveyed by the second reading exit roller 71 toward the sheet ejection port. The second reading roller 70 suppresses floating of the document in the second reader 101, and also serves as a reference white part for obtaining shading data in the second reader 101. In the case of not performing double-sided reading, the document passes through the second reader 101.

The sheet ejector 56 includes a pair of sheet ejection rollers 72 disposed in the vicinity of the sheet ejection port, and ejects the document conveyed by the second reading exit roller 71 onto the sheet ejection tray 12.

The ADF 2 includes, along the conveying path, various sensors such as an abutment sensor 84, a registration sensor 81, and a sheet ejection sensor 83, which are used for conveyance control such as conveyance distance and a conveyance speed of the document.

Furthermore, a document width sensor 85 is provided between the pull-out rollers 65 and the intermediate rollers 66. The document width sensor 85 includes a plurality of photoreceptors arranged in the width direction of the document, and detects the document width on the basis of a light reception result from the irradiation light provided at the opposed position across the conveying path. Note that the length of the document in the conveyance direction is detected from the motor pulse by reading the front end and the rear end of the document using the abutment sensor 84.

Configuration of Image Processing Apparatus

Figure 7:
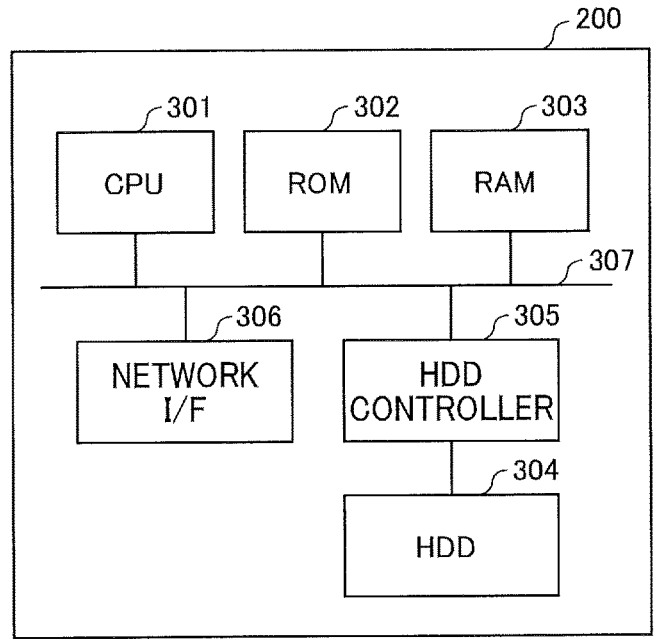
FIG. 7 is a diagram illustrating an exemplary hardware configuration of an image processing apparatus according to the first embodiment.

FIG. 7 is a diagram illustrating an exemplary hardware configuration of an image processing apparatus 200 according to the first embodiment. In FIG. 7, the image processing apparatus 200 is constructed by a computer, and includes a central processing unit (CPU) 301, a read-only memory (ROM) 302, a random-access memory (RAM) 303, a hard disk drive (HDD) 304, an HDD controller 305, a network interface (I/F) 306, a bus line 307, and the like.

The CPU 301 controls the overall operation of the apparatus. The ROM 302 stores a program used to drive the CPU 301, such as initial program loader (IPL). The RAM 303 is used as a work area for the CPU 301. The HDD 304 stores various data, such as programs. The HDD controller 305 controls reading or writing of various data directed to the HDD 304 in accordance with the control of the CPU 301.

The network I/F 306 is an interface for performing data communication with an external device or the like using a network. The bus line 307 is an address bus, a data bus, or the like for electrically connecting each component, such as the CPU 301.

The image processing apparatus 200 implements various functions to be described later by executing, with the CPU 301, processing on the basis of a program.

Figure 8:
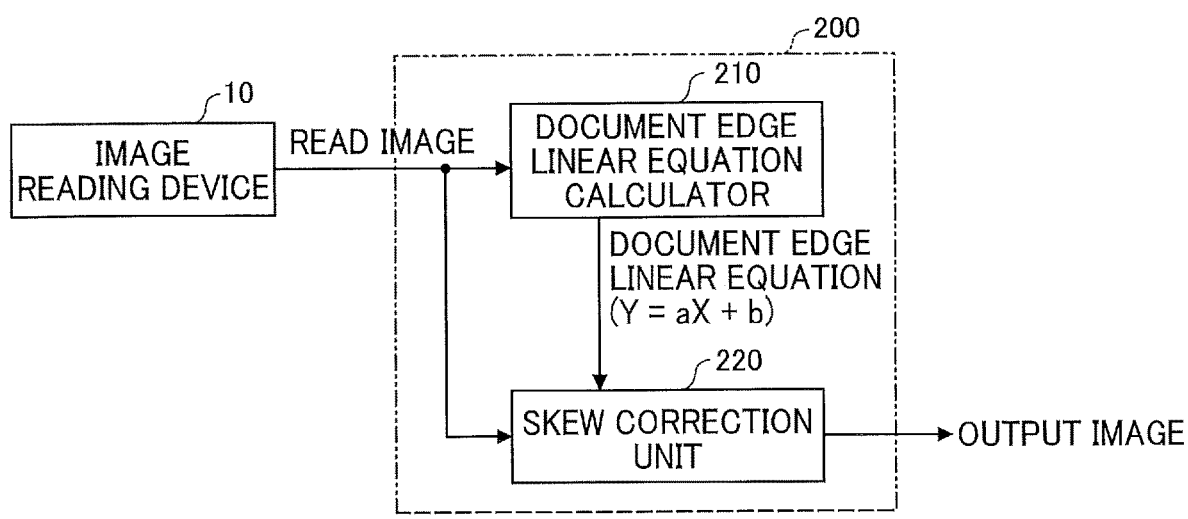
FIG. 8 is a diagram illustrating an exemplary functional configuration of the image processing apparatus, according to the first embodiment.

FIG. 8 is a diagram illustrating an exemplary functional configuration of the image processing apparatus 200. As illustrated in FIG. 8, the image processing apparatus 200 includes a document edge linear equation calculator 210, and a skew correction unit 220. The document edge linear equation calculator 210 and the skew correction unit 220 receives, for example, input of a read image in an RGB format from the image reader 4 described above.

The document edge linear equation calculator 210 calculates, from the input read image, a linear equation (hereinafter referred to as document edge linear equation) that approximates an edge of a side of the document (document edge), and outputs the linear equation to the skew correction unit 220.

The skew correction unit 220 calculates a skew angle $\theta$ on the basis of an inclination "a" of the document edge linear equation ($Y=aX+b$) input from the document edge linear equation calculator 210, performs image correction of rotating the read image to satisfy $\theta=0$ so that an image without skew is generated, and outputs the image.

Figure 9:
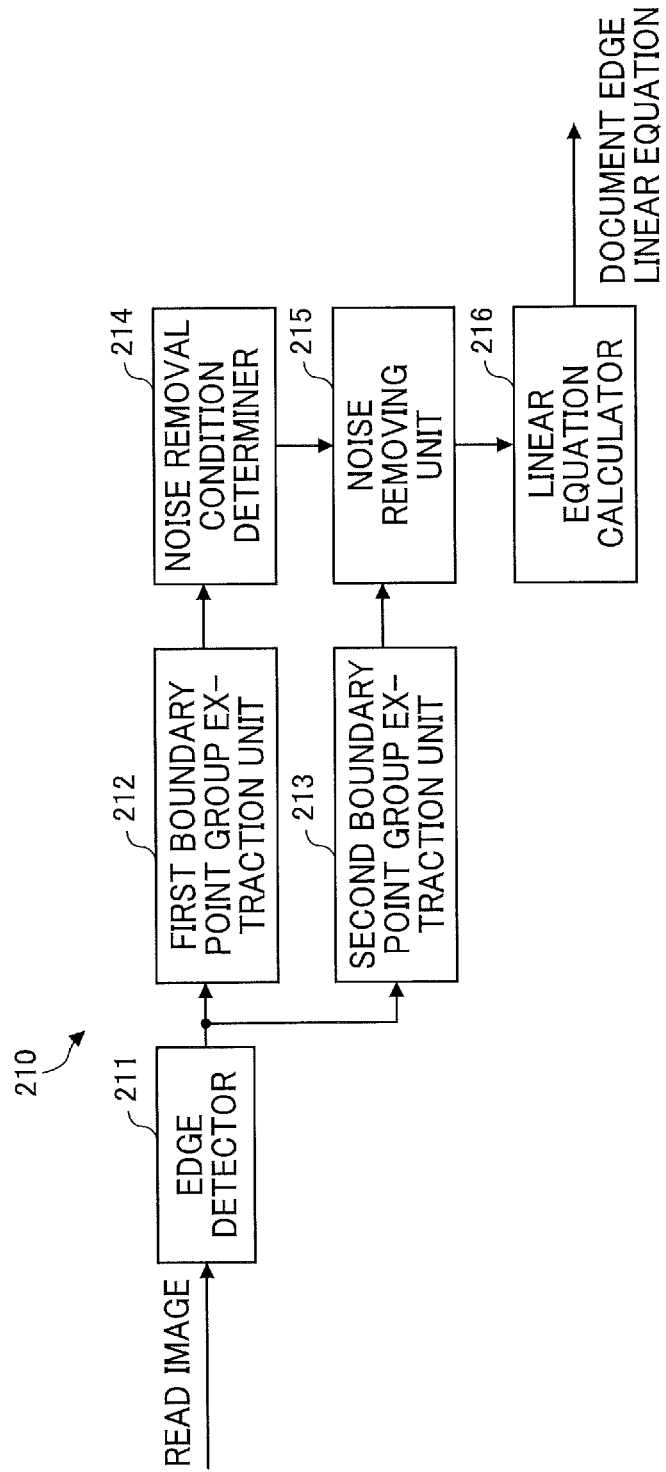
FIG. 9 is a diagram illustrating a detailed configuration of a document edge linear equation calculator, according to the first embodiment.

FIG. 9 is a diagram illustrating a detailed configuration of the document edge linear equation calculator 210. As illustrated in FIG. 9, the document edge linear equation calculator 210 includes an edge detector 211, a first boundary point group extraction unit 212, a second boundary point group extraction unit 213, a noise removal condition determiner 214, a noise removing unit 215, and a linear equation calculator 216.

Figure 10:
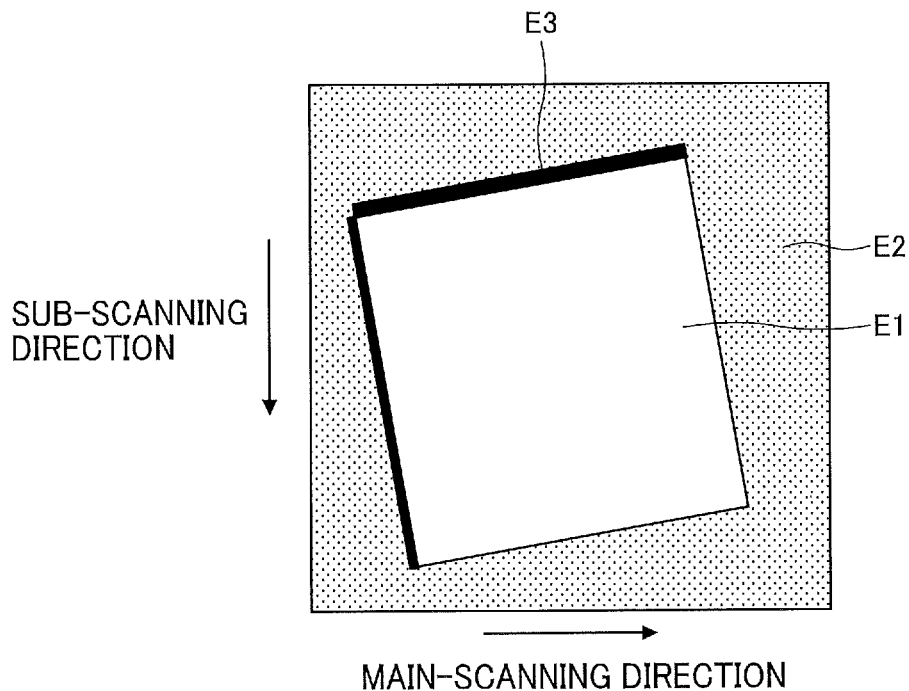
FIG. 10 is a diagram schematically illustrating a read image to be input to an edge detector, according to the first embodiment.
Figure 11:
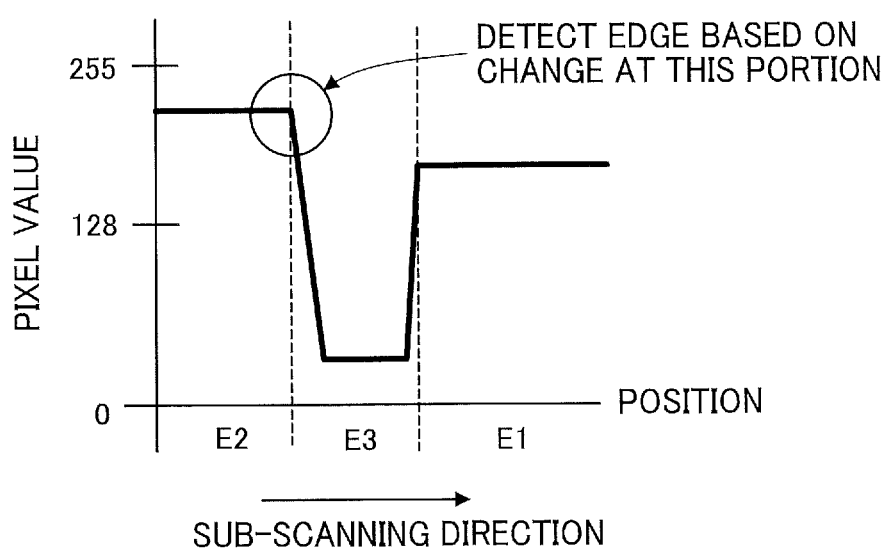
FIG. 11 is a graph schematically illustrating an exemplary change in pixel value in the sub-scanning direction in a read image.

The edge detector 211 detects the document edge on the basis of the read image input from the image reader 4. FIG. 10 is a diagram schematically illustrating a read image to be input to the edge detector 211. FIG. 11 is a graph schematically illustrating an exemplary change in pixel value in the sub-scanning direction in the read image. As illustrated in FIG. 10, the read image includes a document area E1 that is an area in which the document is read, and a background area E2 that is an area in which a background member present in the background of the document is read. In addition, a shadow area E3, which is an area in which the shadow of the document generated during exposure is read, is generated at the edge portion of the document area E1.

The edge detector 211 detects the document edge by detecting a change in pixel value using an image processing filter, such as a primary differential filter. For example, the edge detector 211 detects a change from the background area E3 to the shadow area E2 as an edge. Since the pixel value of the document area E1 changes depending on the input document, stable edge detection can be performed regardless of the document by detecting changing points of the background area E3 and the shadow area E2. Note that, since the pixel value also changes from the shadow area E3 to the document area E1 in most documents, the document edge may be detected on the basis of such a change. In addition, the edge detector 211 may perform edge detection using a secondary differential filter without being limited to a primary differential filter. Moreover, the edge detection may be performed on the basis of threshold processing or the like without using an image processing filter.

Figure 12:
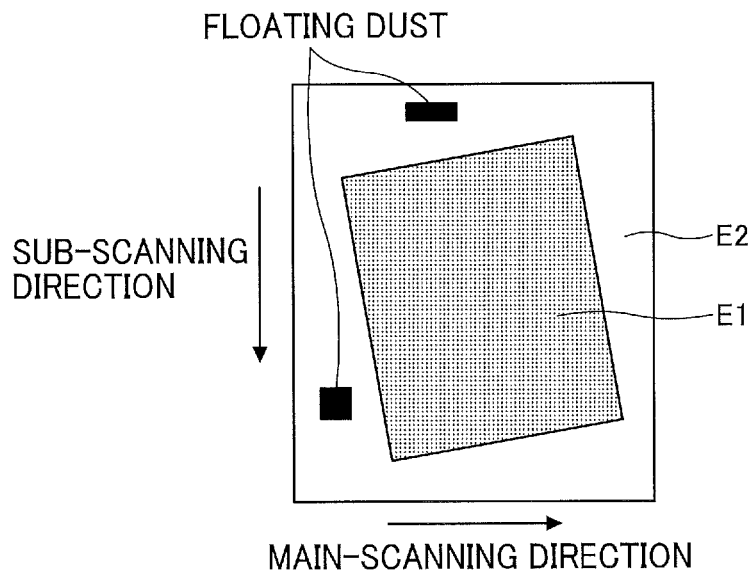
FIG. 12 is a diagram schematically illustrating an exemplary read image in which floating dust is reflected.

During actual ADF reading, paper dust of the document or the like may float as dust between the slit glass 7 and the background member. In that case, the background area of the read image includes an image in which the dust that has floated (hereinafter referred to as floating dust) is read. In such a case of floating dust, it is attached to or separated from the slit glass or the background member during conveyance of the document, and thus block noise appears in the read image. FIG. 12 is a diagram schematically illustrating an exemplary read image in which floating dust is reflected. In FIG. 12, illustration of the shadow area E3 is omitted.

Figure 13:
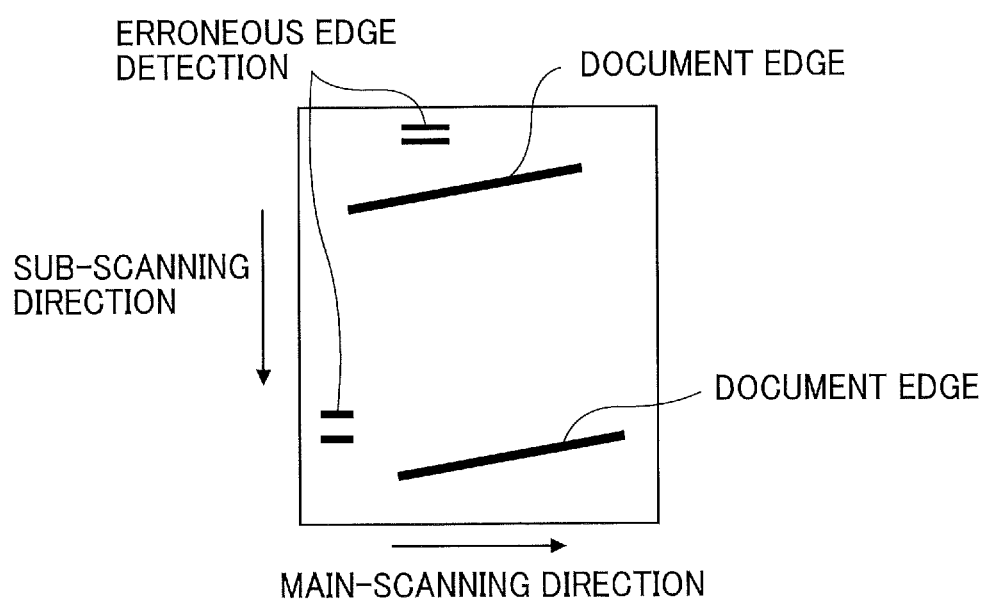
FIG. 13 is a diagram schematically illustrating an exemplary edge detection result in the case where edge detection is performed on the read image illustrated in FIG. 12.

FIG. 13 is a diagram schematically illustrating an exemplary edge detection result in the case where the edge detector 211 performs edge detection on the read image illustrated in FIG. 12. FIG. 13 illustrates an exemplary case of performing filtering for detecting a change in pixel value in the sub-scanning direction. As illustrated in FIG. 13, in the case where floating dust is present, the edge of the floating dust may also be erroneously detected in addition to the document edge as an original target of the edge detection.

Figure 14:
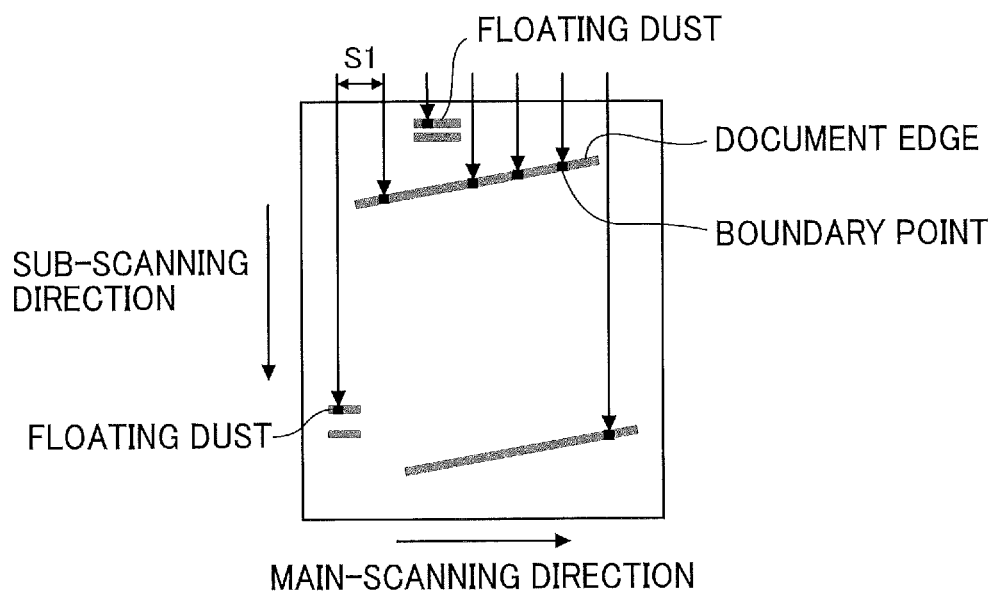
FIG. 14 is a diagram illustrating an exemplary method for extracting a first boundary point group.

Returning to FIG. 9, the first boundary point group extraction unit 212 samples edge detection results detected by the edge detector 211 in the main-scanning direction (first direction) at each first interval S1 to extract a first boundary point group including a plurality of boundary points. FIG. 14 is a diagram illustrating an exemplary method for extracting the first boundary point group. As illustrated in FIG. 14, the first boundary point group extraction unit 212 performs scanning from the front end of the read image in the sub-scanning direction (second direction orthogonal to the first direction) at each first interval S1 in the main-scanning direction to obtain positions in the sub-scanning direction of the boundary points included in the edge detection result.

Figure 15:
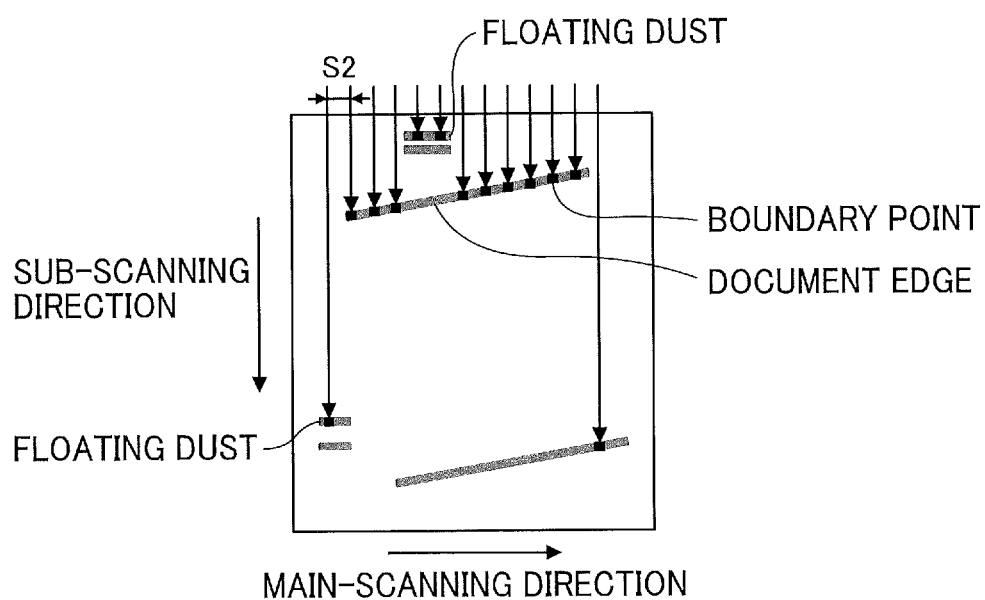
FIG. 15 is a diagram illustrating an exemplary method for extracting a second boundary point group.

The second boundary point group extraction unit 213 samples edge detection results detected by the edge detector 211 in the main-scanning direction at each second interval S2 to extract a second boundary point group including a plurality of boundary points. FIG. 15 is a diagram illustrating an exemplary method for extracting the second boundary point group. As illustrated in FIG. 15, the second boundary point group extraction unit 213 performs scanning from the front end of the read image in the sub-scanning direction at each second interval S2 in the main-scanning direction to obtain positions in the sub-scanning direction of the boundary points included in the edge detection result.

The extraction process performed by the second boundary point group extraction unit differs from the extraction process performed by the first boundary point group extraction unit 212 only in the sampling interval. In the present embodiment, the first interval S1 is set to be larger than the second interval S2 (S1>S2).

The noise removal condition determiner 214 determines a condition for removing noise (noise removal condition) caused by floating dust or the like on the basis of the first boundary point group extracted by the first boundary point group extraction unit 212. With the first interval S1, which is the extraction interval of the first boundary point group, being set to be larger, influence exerted by floating dust or the like can be reduced at the time of determining the noise removal condition. Specifically, since floating dust has a maximum size of several millimeters, the influence exerted by the floating dust can be reduced by the first interval S1 being set to be larger than the size of the floating dust.

Figure 16:
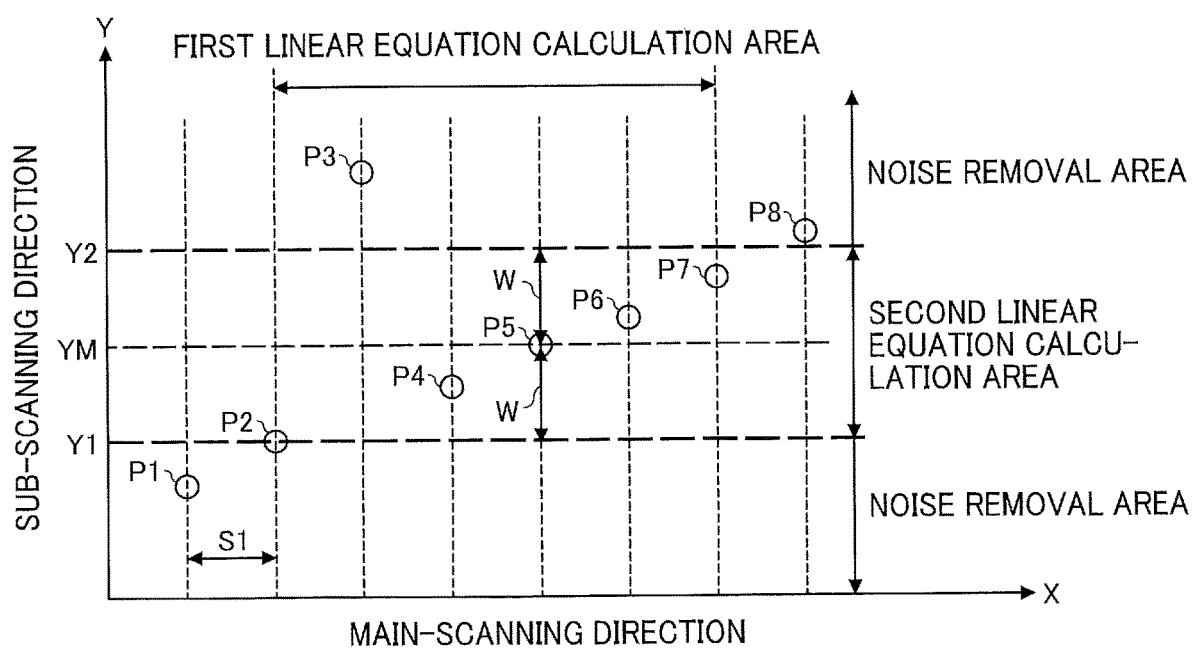
FIG. 16 is a graph for illustrating an exemplary method for determining a noise removal condition.

FIG. 16 is a graph for illustrating a method for determining the noise removal condition by the noise removal condition determiner 214. First, the noise removal condition determiner 214 searches for a boundary point having a median value regarding the position in the sub-scanning direction from the first boundary point group. P1 to P8 illustrated in FIG. 16 exemplify boundary points included in the first boundary point group. In this case, for example, the boundary point P5 takes a median value Y0.

At this time, the noise removal condition determiner 214 searches for a boundary point having a median value using boundary points (boundary points P2 to P7 in the case of FIG. 16) included in the linear equation calculation area (hereinafter referred to as first linear equation calculation area) regarding the main-scanning direction set by the linear equation calculator 216 to be described later. Note that the noise removal condition determiner 214 may search for the boundary point having the median value after removing boundary points (boundary point P3 in the case of FIG. 16) largely different from boundary points adjacent in the sub-scanning direction in advance in consideration of continuity of the first boundary point group.

Then, the noise removal condition determiner 214 sets a value obtained by subtracting a certain value W from a median value YM as a minimum value Y1, sets a value obtained by adding the certain value W to the median value YM as a maximum value Y2, and sets the area from the minimum value Y1 to the maximum value Y2 with respect to the sub-scanning direction as a linear equation calculation area (hereinafter referred to as second linear equation calculation area).

In this manner, the noise removal condition determiner 214 determines the area equal to or less than the minimum value Y1 and the area equal to or more than the maximum value Y2 as a noise removal area (noise removal condition). In other words, the noise removal condition determiner 214 determines to remove boundary points existing in an area separated from the median value in the sub-scanning direction by equal to or more than the certain value W as a noise removal condition.

Returning to FIG. 9, the noise removing unit 215 removes, from the second boundary point group extracted by the second boundary point group extraction unit 213, boundary points (boundary points whose positions with respect to the sub-scanning direction are included in the noise removal area) satisfying the noise removal condition determined by the noise removal condition determiner 214. As a result, boundary points caused by floating dust as illustrated in FIG. 15 are removed from the second boundary point group as noise.

The linear equation calculator 216 calculates, on the basis of the second boundary point group from which noise has been removed by the noise removing unit 215, a linear equation (document edge linear equation) that approximates the second boundary point group by the least-square method or the like. The linear equation calculator 216 provides, out of the calculated document edge linear equation ($Y=aX+b$), at least the inclination "a" to the skew correction unit 220. Note that the linear equation calculator 216 uses, out of the second boundary point group from which the noise has been removed, the boundary points included in the first linear equation calculation area to calculate the document edge linear equation.

By narrowing the second interval S2 and increasing the number of samplings to reduce influence of random noise and the like, accuracy in calculation of the document edge linear equation can be improved.

Next, the certain value W used by the noise removal condition determiner 214 to determine the noise condition will be described. The certain value W may be a fixed value, but may be changed depending on the first linear equation calculation area set by the linear equation calculator 216.

For example, the linear equation calculator 216 changes the first linear equation calculation area according to the document size. In a case where the document size is "A3 portrait", for example, the first linear equation calculation area is set to be larger than the case where the document size is "A4 portrait".

Figure 17A:
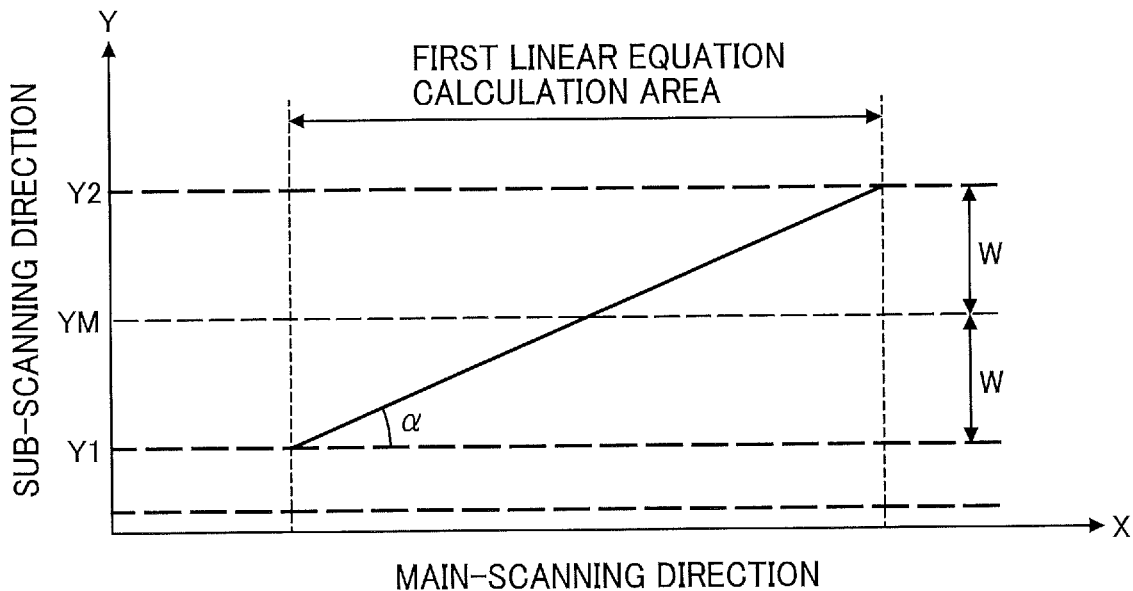
FIGS. 17A and 17B are exemplary graphs illustrating a relationship between a size of a first linear equation calculation area and a certain value W.
Figure 17B:
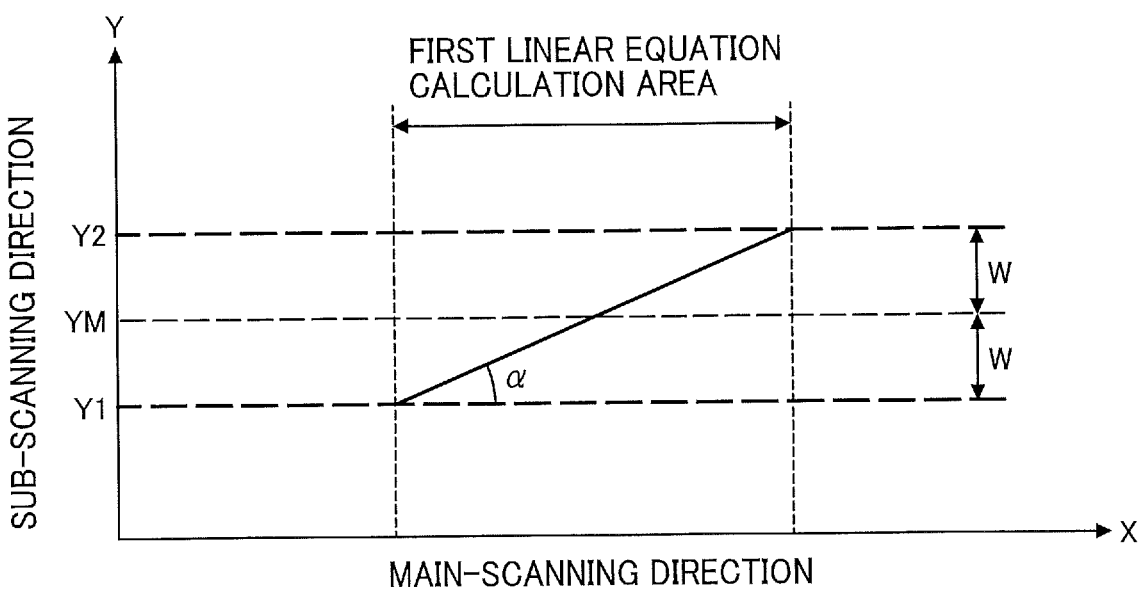

FIGS. 17A and 17B are graphs illustrating a relationship between the size of the first linear equation calculation area and the certain value W. FIG. 17A illustrates a case where the document size is larger than the document size in FIG. 17B and the first linear equation calculation area is large. In FIGS. 17A and 17B, a represents the maximum angle that requires skew correction performed by the skew correction unit 220. When the length of the first linear equation calculation area is set to be L, the certain value W is expressed by the following formula (1).

$$W=(L/2)\times\tan\alpha \quad (1)$$

It is sufficient if the noise removal condition determiner 214 determines the certain value W on the basis of the formula (1) above.

As described above, with the image processing apparatus 200 according to the present embodiment, a noise removal condition is determined on the basis of the first boundary point group extracted at each first interval S1 from the document edge, and noise is removed from the second boundary point group extracted at each second interval S2 from the document edge on the basis of the noise removal condition, whereby global noise having a certain size or more, such as noise caused by floating dust, can be reduced. Furthermore, since the document edge linear equation is calculated on the basis of the second boundary point group in which noise is reduced in such a manner, the accuracy in electric skew correction is improved.

Variations of First Embodiment

Next, variations of the first embodiment will be described.

First Variation

First, a variation related to a method for determining a noise removal condition performed by a noise removal condition determiner 214 will be described as a first variation. In the first embodiment, a median value regarding the sub-scanning direction is obtained from the first boundary point group, and the noise removal area is determined using the median value as a reference. In the present variation, an approximation straight line that approximates a first boundary point group is obtained, and a noise removal area is determined using the approximation straight line as a reference.

Figure 18:
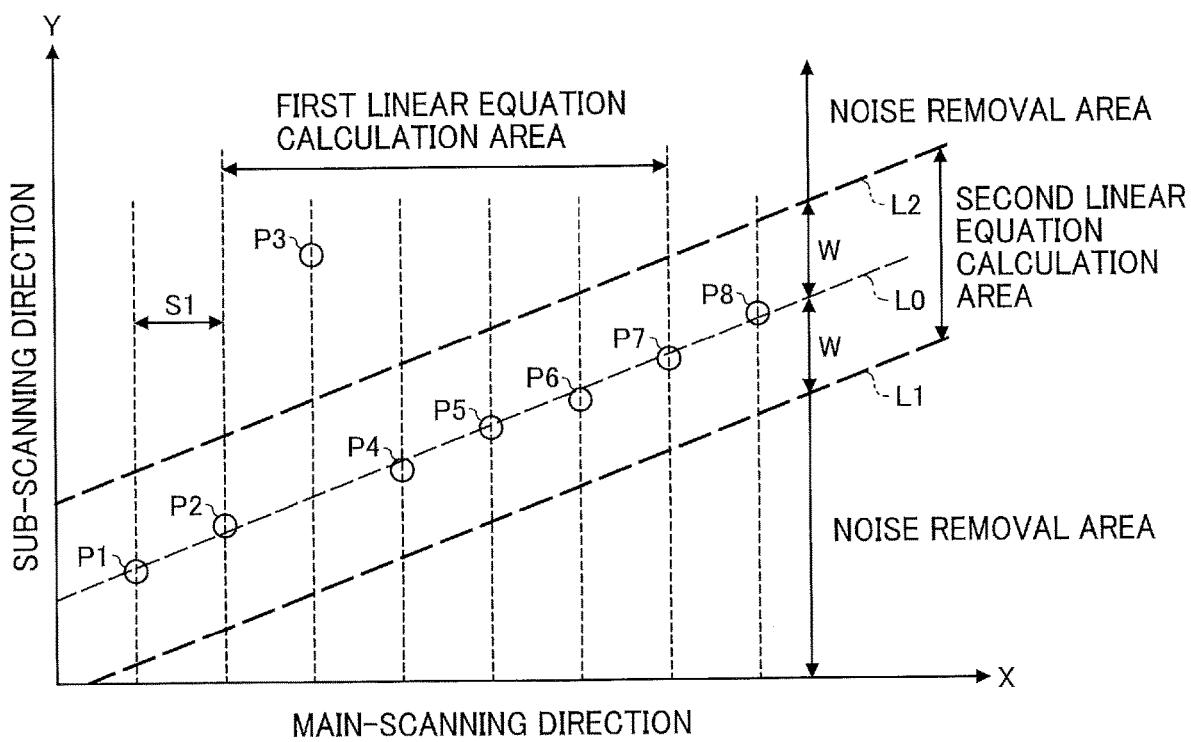
FIG. 18 is a graph for illustrating a method for determining a noise removal condition according to a first variation.

FIG. 18 is a graph for illustrating a method for determining a noise removal condition according to the first variation. In the present variation, first, the noise removal condition determiner 214 obtains an approximation straight line L0 by the least-square method or the like on the basis of the first boundary point group. For example, the noise removal condition determiner 214 calculates the approximation straight line L0 using boundary points (boundary points P2 to P7 in the case of FIG. 18) included in a first linear equation calculation area set by a linear equation calculator 216. Note that the noise removal condition determiner 214 may calculate the approximation straight line L0 after removing boundary points (boundary point P3 in the case of FIG. 18) largely different from boundary points adjacent in the sub-scanning direction in advance in consideration of continuity of the first boundary point group.

Then, the noise removal condition determiner 214 sets a straight line obtained by subtracting a certain value W from the approximation straight line L0 as a lower limit line L1, sets a straight line obtained by adding the certain value W to the approximation straight line L0 as an upper limit line L2, and sets a range between the lower limit line L1 and the upper limit line L2 as a second linear equation calculation area.

In this manner, the noise removal condition determiner 214 determines the area equal to or less than the lower limit line L1 and the area equal to or more than the upper limit line L2 as a noise removal area (noise removal condition). In other words, the noise removal condition determiner 214 determines to remove boundary points existing in an area separated from the approximation straight line L0 in the sub-scanning direction by equal to or more than the certain value W as a noise removal condition.

While the method for determining a noise removal condition according to the first embodiment can achieve an increase in the calculation speed as the noise removal condition is determined on the basis of a median value that can be easily calculated, with the noise removal condition being determined on the basis of the approximation straight line of the first boundary point group as in the present variation, the noise removal area is made constant regardless of the main-scanning direction, and the noise removal accuracy is improved.

Second Variation

Figure 19:
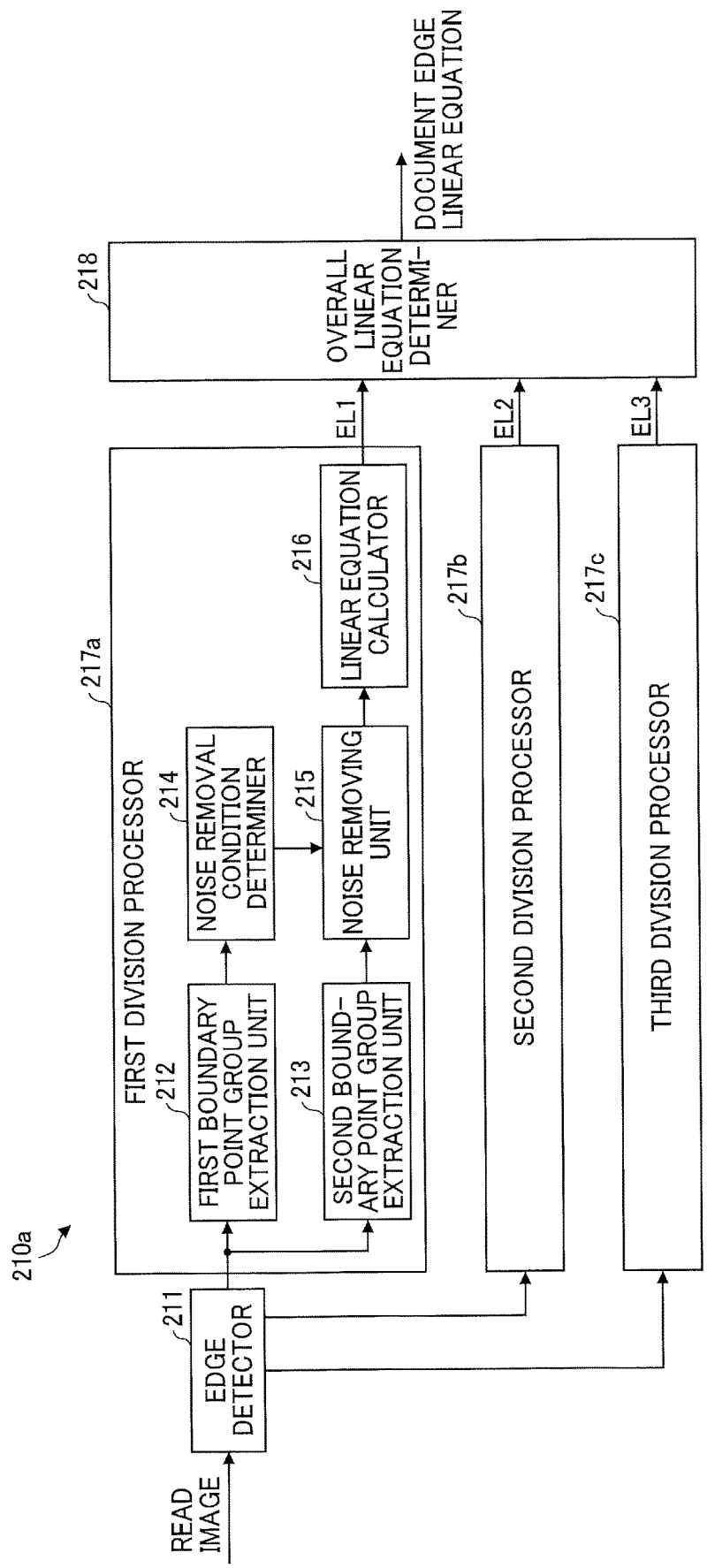
FIG. 19 is a diagram illustrating a configuration of a document edge linear equation calculator according to a second variation.

Next, a variation related to a method for calculating a document edge linear equation will be described as a second variation. FIG. 19 is a diagram illustrating a configuration of a document edge linear equation calculator 210a according to the second variation. The document edge linear equation calculator 210a includes an edge detector 211, first to third division processors 217a to 217c, and an overall linear equation determiner 218. The edge detector 211 has a configuration similar to the configuration in the first embodiment.

The first to third division processors 217a to 217c have similar configurations, and include a first boundary point group extraction unit 212, a second boundary point group extraction unit 213, a noise removal condition determiner 214, a noise removing unit 215, and a linear equation calculator 216. Each of those components has a configuration similar to the configuration in the first embodiment.

The first to third division processors 217a to 217c calculate document edge linear equations for first to third divided areas obtained by dividing the document edge detected by the edge detector 211 into three in the main-scanning direction.

Figure 20:
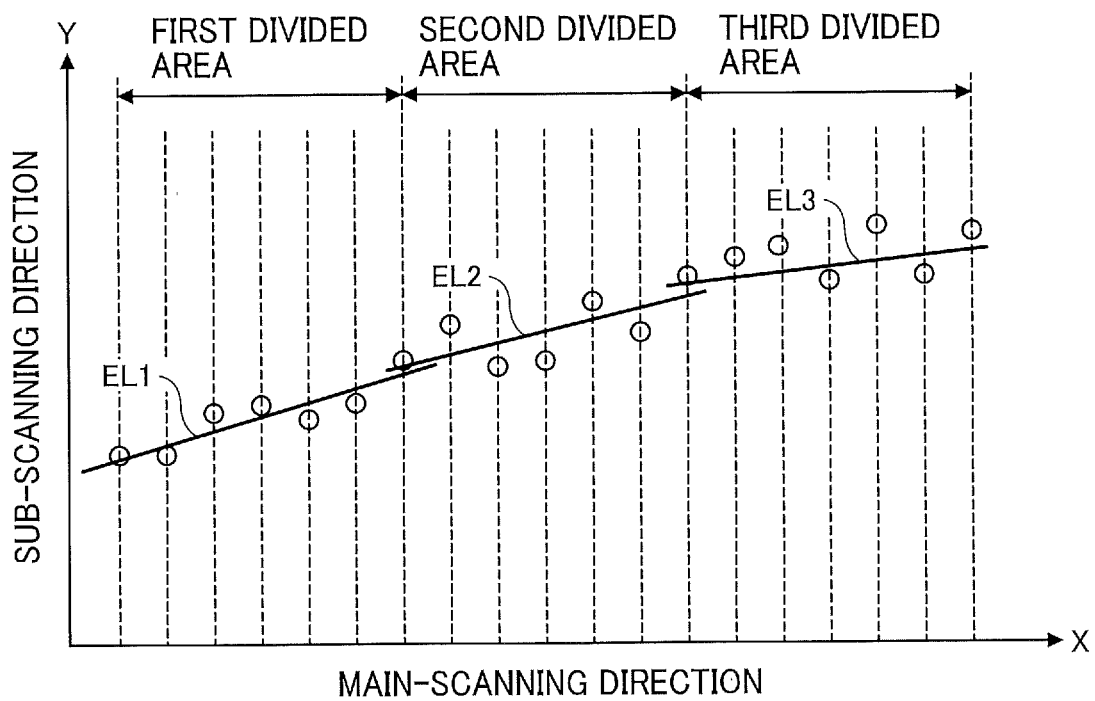
FIG. 20 is a graph exemplifying first to third divided areas obtained by dividing a document edge.

FIG. 20 is a graph exemplifying the first to third divided areas obtained by dividing the document edge. The first division processor 217a calculates a first document edge linear equation EL1 by performing the process described in the first embodiment on the first divided area. Similarly, the second division processor 217b calculates a second document edge linear equation EL2 by performing the process on the second divided area. Similarly, the third division processor 217c calculates a third document edge linear equation EL3 by performing the process on the third divided area.

The overall linear equation determiner 218 determines one overall linear equation (overall linear equation) on the basis of the first to third document edge linear equations EL1 to EL3 calculated by the first to third division processors 217a to 217c. For example, the overall linear equation determiner 218 determines an overall linear equation by selecting, from among the first to third document edge linear equations EL1 to EL3, an equation having an inclination closest to the average. In the case of FIG. 20, for example, the second document edge linear equation EL2 is selected and determined as an overall linear equation.

In the present variation, a skew correction unit 220 performs skew correction on the basis of the inclination of the overall linear equation determined by the overall linear equation determiner 218.

In general, when the document to be read is normal, inclinations of the first to third document edge linear equations EL1 to EL3 are substantially equal to each other. However, in a case where a part of the document is missing, the edge of the document is partially bent, or the like, the document edge is not linear as a whole, and a part of the document has an inclination different from the normal document edge. When a document edge linear equation is calculated by the method according to the first embodiment in such a case, an inclination largely deviating from the actual inclination may be calculated due to the influence exerted by the missing part or bent part of the document. In the present variation, a linear equation (abnormal linear equation) calculated on the basis of a divided area including a part where the document is missing or bent is removed by the overall linear equation determiner 218, whereby a document edge linear equation with high accuracy can be obtained. As a result, the skew correction accuracy is improved.

Note that, although three division processors are provided in the present variation, the number of division processors is not limited to three, and may be set as appropriate. Alternatively, a single division processor may be used, and the single division processor may perform processing in a time division manner for a plurality of divided areas to calculate a plurality of document edge linear equations.

Third Variation

Figure 21:
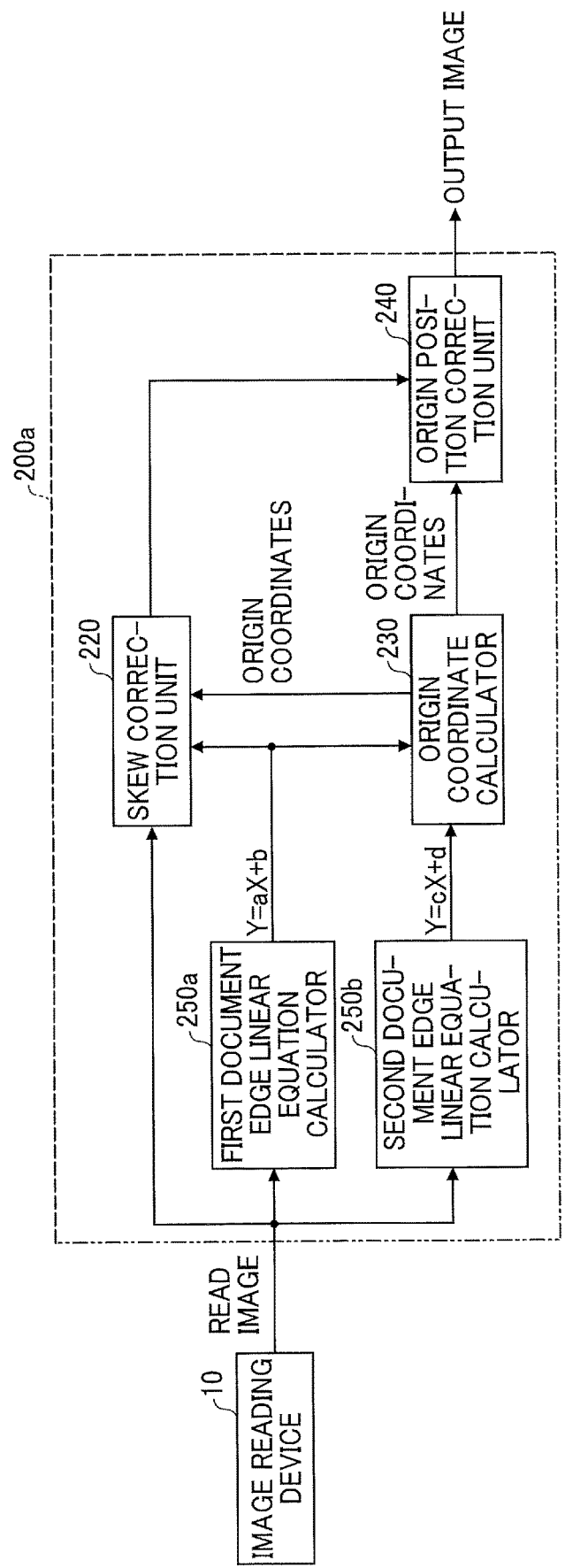
FIG. 21 is a diagram illustrating an exemplary functional configuration of an image processing apparatus according to a third variation.

Next, an image processing apparatus capable of correcting an origin position of a document in addition to performing skew correction will be described as a third variation. FIG. 21 is a diagram illustrating an exemplary functional configuration of an image processing apparatus 200a according to the third variation. As illustrated in FIG. 21, the image processing apparatus 200a includes a first document edge linear equation calculator 250a, a second document edge linear equation calculator 250b, a skew correction unit 220, an origin coordinate calculator 230, and an origin position correction unit 240.

The first document edge linear equation calculator 250a has a configuration similar to the configuration of the document edge linear equation calculator 210 according to the first embodiment, and calculates a linear equation (Y=aX+b) of a first document edge substantially parallel to the main-scanning direction of the document.

The second document edge linear equation calculator 250b calculates a linear equation (Y=cX+d) of a second document edge substantially parallel to the sub-scanning direction of the document by performing scanning in the main-scanning direction from the side edge of a read image. The second document edge linear equation calculator 250b has a configuration similar to the configuration of the first document edge linear equation calculator 250a except that the main-scanning direction and the sub-scanning direction are reversed in the process.

The origin coordinate calculator 230 obtains an intersection point of the first document edge linear equation (Y=aX+b) calculated by the first document edge linear equation calculator 250a and the second document edge linear equation (Y=cX+d) calculated by the second document edge linear equation calculator 250b, and outputs the coordinates of the intersection point as origin coordinates (X0, Y0) of a document area E1. The origin coordinates are supplied to the skew correction unit 220 and to the origin position correction unit 240.

In a similar manner to the first embodiment, the skew correction unit 220 calculates a skew angle θ on the basis of an inclination "a" of the first document edge linear equation (Y=aX+b), and performs image correction of rotating the read image to satisfy θ=0. At this time, the skew correction unit 220 further rotates the read image around the origin coordinates (X0, Y0).

The origin position correction unit 240 performs origin position correction for translating the document area E1 in the read image having been subject to the skew correction performed by the skew correction unit 220 so that the origin coordinates (X0, Y0) coincide with the origin point of the read image. Then, the origin position correction unit 240 outputs an image obtained by cutting out the document area E1 from the read image having been subject to the skew correction and the origin position correction.

Figure 22D:
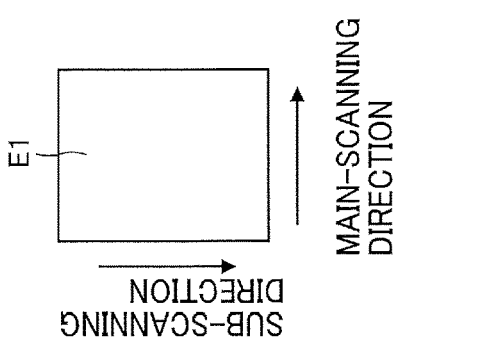
FIGS. 22A to 22D are diagrams illustrating transition of a read image in the image processing apparatus according to the third variation.
Figure 22C:
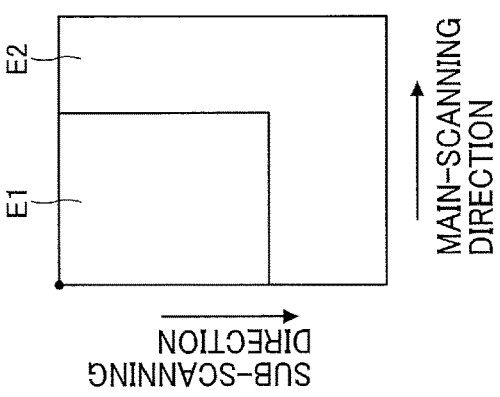
Figure 22B:
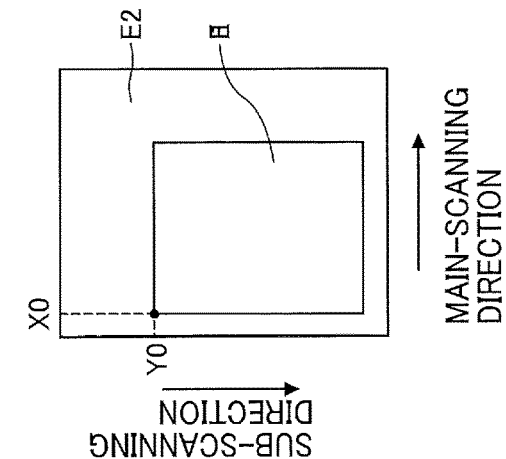
Figure 22A:
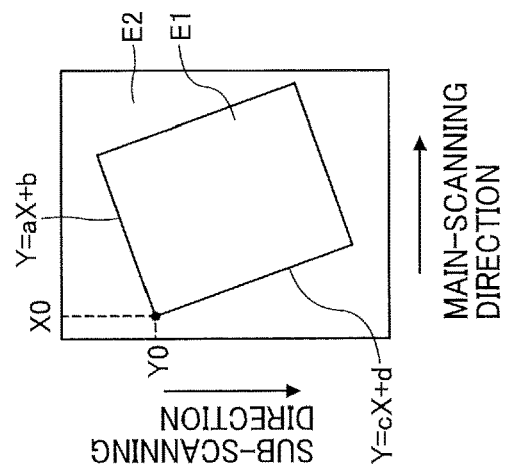

FIGS. 22A to 22D are diagrams illustrating transition of a read image in the image processing apparatus 200a according to the third variation. FIG. 22A illustrates an initial read image before skew correction and origin position correction are performed. FIG. 22B illustrates a read image after the skew correction is performed by the skew correction unit 220. FIG. 22C illustrates a read image after the origin position correction is performed by the origin position correction unit 240. FIG. 22D illustrates an output image of the document area E1 cut out from the read image.

At the time of ADF reading, the document may be read with the origin position being shifted due to the influence exerted by the document position being shifted, the document being skewed, or the like during conveyance. In such a case, a background area E2 may be reflected at the front end of the document that a user originally desires to read, or the rear end of the document area E1 may be missing. According to the present variation, it becomes possible to obtain an output image in which skew and origin position deviation are corrected, which is desired by the user.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image processing apparatus comprising:
circuitry configured to:
obtain a read image read from an image of a document output from an image reading device;
detect an edge between a background area and a document area in the read image;
sample a detection result of the edge at each first interval in a first direction to extract a first boundary point group including a plurality of boundary points;
sample the detection result of the edge at each second interval in the first direction to extract a second boundary point group including a plurality of boundary points;
determine a noise removal condition based on the first boundary point group;
remove, from the second boundary point group, a boundary point satisfying the noise removal condition as noise; and
calculate a linear equation approximating the second boundary point group from which the noise is removed.

2. The image processing apparatus according to claim 1, wherein the first interval is larger than the second interval.

3. The image processing apparatus according to claim 1, wherein the circuitry obtains a median value for a position related to a second direction orthogonal to the first direction of the first boundary point group, and determines, as the noise removal condition, to remove a boundary point existing in an area separated from the median value by a certain value or more in the second direction.

4. The image processing apparatus according to claim 3, wherein the circuitry calculates the linear equation using a boundary point included in a linear equation calculation area related to the first direction in the second boundary point group from which the noise is removed, and
changes the certain value depending on a size of the linear equation calculation area.

5. The image processing apparatus according to claim 1, wherein the circuitry obtains an approximation straight line approximating the first boundary point group, and determines, as the noise removal condition, to remove a boundary point existing in an area separated from the approximation straight line by a certain value or more in a second direction orthogonal to the first direction.

6. The image processing apparatus according to claim 1, wherein the circuitry obtains a linear equation for each of a plurality of divided areas obtained by dividing the edge in the first direction, and determines an overall linear equation based on a plurality of the linear equations having been obtained.

7. The image processing apparatus according to claim 1, wherein the circuitry performs skew correction based on the calculated linear equation.

8. The image processing apparatus according to claim 6, wherein the circuitry performs skew correction based on the determined overall linear equation.

9. The image processing apparatus according to claim 1, wherein the circuitry calculates a linear equation for each of two orthogonal sides of the document, and
obtains an intersection point of the two calculated linear equations to calculate an origin coordinate.

10. The image processing apparatus according to claim 9, wherein the circuitry corrects an origin position of the read image based on the calculated origin coordinate.

11. A method for processing an image comprising:
obtaining a read image read from an image of a document output from an image reading device;
detecting an edge between a background area and a document area in the read image;
sampling a detection result of the edge at each first interval in a first direction to extract a first boundary point group including a plurality of boundary points;
sampling the detection result of the edge at each second interval in the first direction to extract a second boundary point group including a plurality of boundary points;
determining a noise removal condition based on the first boundary point group;
removing, from the second boundary point group, a boundary point satisfying the noise removal condition as noise; and
calculating a linear equation approximating the second boundary point group from which the noise is removed.

12. A non-transitory recording medium which, when executed by one or more processors, cause the processors to perform a method for processing an image comprising:
obtaining a read image read from an image of a document output from an image reading device;
detecting an edge between a background area and a document area in the read image;
sampling a detection result of the edge at each first interval in a first direction to extract a first boundary point group including a plurality of boundary points;
sampling the detection result of the edge at each second interval in the first direction to extract a second boundary point group including a plurality of boundary points;
determining a noise removal condition based on the first boundary point group;
removing, from the second boundary point group, a boundary point satisfying the noise removal condition as noise; and
calculating a linear equation approximating the second boundary point group from which the noise is removed.

* * * * *